(12) United States Patent
Gupta et al.

(10) Patent No.: US 7,966,290 B2
(45) Date of Patent: Jun. 21, 2011

(54) BACKUP WITHOUT OVERHEAD OF INSTALLED BACKUP AGENT

(75) Inventors: Ranjan K. Gupta, Salt Lake City, UT (US); Scott Alan Isaacson, Kamuela, HI (US); Kattiganehalli Y. Srinivasan, Princeton Junction, NJ (US)

(73) Assignee: Novell, Inc., Provo, UT (US)

( * ) Notice: Subject to any disclaimer, the term of this patent is extended or adjusted under 35 U.S.C. 154(b) by 400 days.

(21) Appl. No.: 12/220,878

(22) Filed: Jul. 29, 2008

(65) Prior Publication Data

US 2010/0030983 A1    Feb. 4, 2010

(51) Int. Cl.
*G06F 17/30* (2006.01)
(52) U.S. Cl. ....................................................... 707/640
(58) Field of Classification Search .................. 707/2, 3, 707/640; 711/162
See application file for complete search history.

(56) References Cited

U.S. PATENT DOCUMENTS

| | | | |
|---|---|---|---|
| 7,093,086 B1 | 8/2006 | van Rietschote | |
| 7,287,083 B1 | 10/2007 | Nay et al. | |
| 7,669,020 B1 * | 2/2010 | Shah et al. ................. | 711/162 |
| 2004/0044643 A1 | 3/2004 | deVries et al. | |
| 2005/0108593 A1 | 5/2005 | Purushothaman et al. | |
| 2005/0120160 A1 | 6/2005 | Plouffe et al. | |
| 2007/0244938 A1 | 10/2007 | Michael et al. | |
| 2007/0255775 A1 | 11/2007 | Manolov et al. | |
| 2007/0271428 A1 | 11/2007 | Atluri | |
| 2008/0016178 A1 | 1/2008 | Portugali | |
| 2008/0016387 A1 | 1/2008 | Bensinger | |
| 2008/0098392 A1 | 4/2008 | Wipfel et al. | |

OTHER PUBLICATIONS

"SUSE Linux Enterprise Server"; Greg Pryzby, Novell; May 8, 2006; 74 pages.
"Virtualisierung mit Zen"; Sep. 28, 2006; Ralf Dannert, Novell; 72 pages.
"Novell Open Enterprise Server: Novell Branch Office"; 2008; www.novell.com/products/openenterpriseserver/branchoffice.html, 14 pages.
"Pervasive Software-Pervasive Backup Agent Overview"; Jun. 26, 2008; http://ww2.pervasive.com/database/products/Backup/Agent, pages/B, 2 pages.
"Xen—Wikipedia, the Free Encyclopedia"; Jul. 5, 2008; http://en.wikipedia.org/wiki/Xen_%28virtual_machines_monitor%29, 4 pages.
"Hypervisor—Wikipedia, the Free Encyclopedia"; Jul. 8, 2008; http://en.wikipedia.org/wiki/Hypervisor. 6 pages.

* cited by examiner

*Primary Examiner* — Etienne P LeRoux
(74) *Attorney, Agent, or Firm* — King & Schickli, PLLC

(57) ABSTRACT

Methods and apparatus involve providing computing backup for virtual representations on a physical hardware platform without the attendant overhead of an installed backup agent per each of the virtual representations. Representatively, a hardware platform has a processor and memory upon and a plurality of virtual machines are configured on the processor and memory as guest computing devices by way of scheduling control of a hypervisor layer. A common I/O path between the virtual machines and the hardware platform exists in the hypervisor layer and a single backup agent for the entirety of the virtual machines monitors data flows in the common I/O path. In this way, each virtual machine avoids dedicated backup agents, and their attendant overhead, especially by avoiding backup agents configured uniquely per a guest operating system, a guest file system, etc. Some other features contemplate particular I/O paths, operating systems, hypervisors, domains, and computer program products.

25 Claims, 3 Drawing Sheets

BACKUP WITHOUT OVERHEAD OF INSTALLED BACKUP AGENT

FIELD OF THE INVENTION

Generally, the present invention relates to computing devices and computing environments involving computing backup. Particularly, although not exclusively, it relates to backup agents in a virtual environment without the overhead of backup agents per each virtual representation. Other features contemplate locating the backup agent, I/O paths, configuration of computing devices, and computer program products, to name a few.

BACKGROUND OF THE INVENTION

As presently exists, physical servers provide a myriad of services and most have an installed backup agent interacting with a remote backup server to provide restoration services in the event of server failure. However, just as servers have a diversity of services, they also have a diversity of configuration, such as in their operating system, hardware device drivers, storage interfaces, file systems, applications, etc. Since backup agents are tightly correlated to these configurations, there are multiple varieties of backup agents. In that each is essentially configured to match the server's configuration, they do not transfer well to other servers having vastly different operating systems, storage interfaces, file systems, applications, etc.

With the advent of virtual computing devices, many virtual servers can be guested on a single hardware platform, including each with its own operating system, drivers, interfaces, applications, etc. Carrying forward the model of having an installed backup agent per each server results in the diagrammatic configuration 10 of FIG. 1. Namely, a single hardware platform 20 can host a variety of virtual machines 30-1, 30-2, 30-3, each with their own operating systems (OS1, OS2, OS3), dedicated applications (app 1 and app 2), file systems, etc. To effectively provide backup and restoration via common storage 40, each virtual machine 30 has its own backup agent 50-1, 50-2, 50-3 uniquely configured to match the operating system, files, applications, etc., of the virtual machine in which it is installed. While this configuration provides the backup agents 50 with convenient file system or file level access, it adds costly overhead in the form of needing multiple uniquely configured backup agents per their own guest operating system, guest file system, etc. It also adds overhead in coordinating/managing all the backup agents in a single, physical computing device, especially when they all may be vastly different from one another.

Accordingly, a need exists in the art of computing backup for less costly overhead. The need further contemplates a system that can provide commonality to ease coordination and management activities in a single computing device having pluralities of virtual machines. Naturally, any improvements along such lines should further contemplate good engineering practices, such as ease of implementation, unobtrusiveness, stability, etc.

SUMMARY OF THE INVENTION

The foregoing and other problems become solved by applying the principles and teachings associated with the hereinafter-described computing backup without overhead of an installed backup agent. At a high level, methods and apparatus involve virtual distribution representations (vDISTRO) on a physical hardware platform, but each has a common backup agent in a physical distribution layer (pDISTRO) without the attendant overhead of an installed backup agent per each virtual representation. Especially avoided is overhead in the form of backup agents configured uniquely per a guest operating system, a guest file system, etc., or coordination of a plurality of diverse backup agents.

In a particular embodiment, a hardware platform has a processor and memory and a plurality of virtual machines are configured on the processor and memory as guest computing devices by way of the scheduling control of a hypervisor layer. An I/O path exists in the hypervisor layer between the virtual machines and the hardware platform and a single backup agent for the entirety of the virtual machines monitors data flows in the I/O path. Representatively, the I/O path may also exist as 1) a direct path between physical drivers in a dom0 domain and the hardware platform or 2) a virtual path between virtual drivers in a domU domain and the physical drivers in the dom0 domain.

Consequently, the contemporaneous backup agent model is re-factored as services move from physical servers to virtual servers, including enhancing traditional backup and restore features for virtual servers that were not possible with just physical servers and now backup is supportable in a guest-independent fashion. Also, the function of the pDISTRO and its disk drivers and interfaces is leveraged to perform backup and restore features on behalf of the vDISTROS without the overhead of involving each of the vDISTROS in the backup and restore processes.

Executable instructions loaded on one or more computing devices for undertaking the foregoing are also contemplated as are computer program products available as a download or on a computer readable medium. The computer program products are also available for installation on a network appliance or individual computing devices.

These and other embodiments of the present invention will be set forth in the description which follows, and in part will become apparent to those of ordinary skill in the art by reference to the following description of the invention and referenced drawings or by practice of the invention. The claims, however, indicate the particularities of the invention.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, methods and apparatus for providing computing backup without the attendant overhead of an installed backup agent per each of many virtual representations is hereinafter described.

Figure 1:
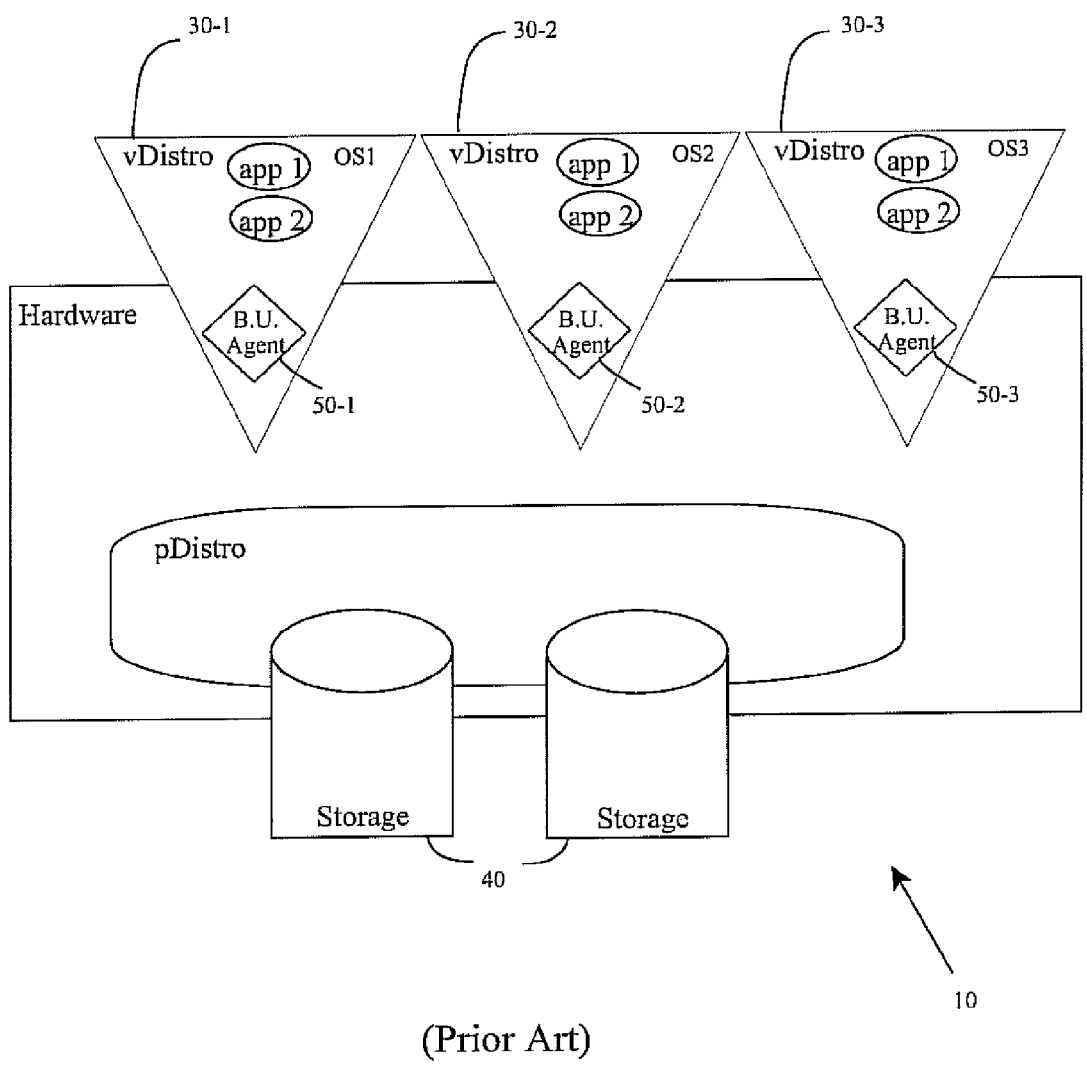
FIG. 1 is a diagrammatic view in accordance with the prior art for backup agents in a virtual environment.
Figure 2:
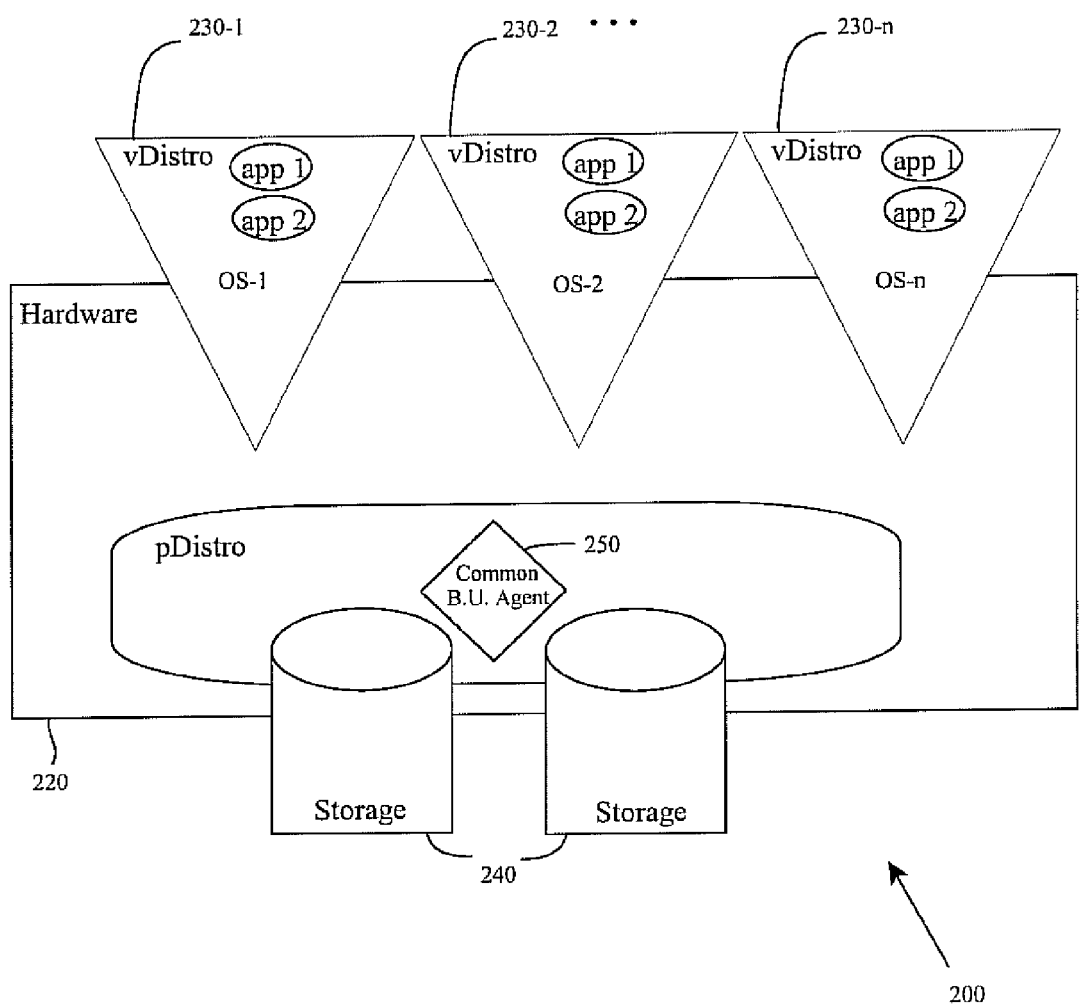
FIG. 2 is a representative diagrammatic view in accordance with the present invention for backup agents in a virtual environment without the overhead of backup agents per each virtual representation.

With reference to FIG. 2, a representative computing system environment 200 includes a single hardware platform 220 hosting a variety of virtual machines 230-1, 230-2, ... 230-*n*. In turn, each virtual machine includes its own guest operating system (OS-1, OS-2, ... OS-*n*), dedicated applications (app 1 and app 2), file system, etc. However, to effectively provide backup and restoration via common storage 240, each virtual machine 230 has a common backup agent 250 in a physical distribution layer (pDISTRO) that centrally traps block-level I/O backup/restore calls to/from the virtual machines. In this manner, no longer are dedicated backup agents per each virtual representation needed in a single, physical computing device and management thereof becomes more easily effectuated. As will be seen, it also leverages the function of the pDISTRO and its disk drivers and interfaces to perform backup and restore features on behalf of the vDISTROS without the overhead of involving each of the vDISTROS in the backup and restore processes.

Figure 3:
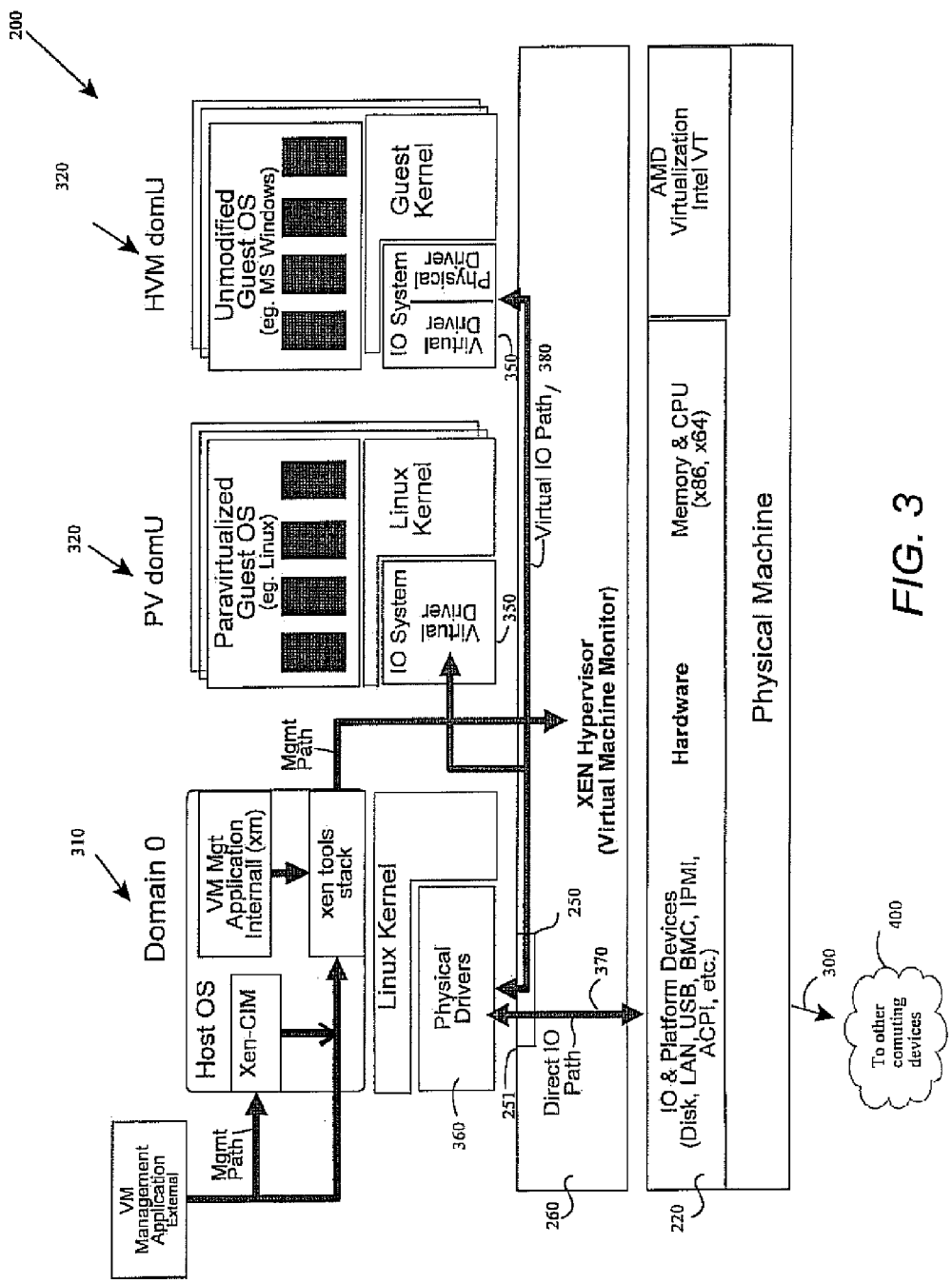
FIG. 3 is a more detailed diagrammatic view in accordance with the present invention for the features of FIG. 2.

In more detail (FIG. 3), a representative computing system environment 200 includes a computing device in the form of a server. It can be of a traditional type, such as a grid or blade server, and can fulfill any future-defined or traditional role, such as a web server, email server, database server, file server, etc. In network, it is arranged to communicate 300 with one or more other computing devices or networks, and skilled artisans readily understand the configuration. For example, the server may use wired, wireless or combined connections, to other devices/networks and may be direct or indirect connections. If direct, they typify connections within physical or network proximity (e.g., intranet). If indirect, they typify connections such as those found with the internet, satellites, radio transmissions, or the like, and are given nebulously as element 400. In this regard, other contemplated items include other servers, routers, peer devices, modems, Tx lines, satellites, microwave relays or the like. The connections may also be local area networks (LAN), wide area networks (WAN), metro area networks (MAN), etc., that are presented by way of example and not limitation. The topology is also any of a variety, such as ring, star, bridged, cascaded, meshed, or other known or hereinafter invented arrangement.

In configuration, the physical server can be arranged in a variety of ways, including virtual representations such as according to the Xen architecture for Novell, Inc., (the assignee of the invention). Namely, the architecture can include a multiplicity of domains (dom0, 310 or domU, 320) and a variety of operating systems (Host OS or Guest OS) (e.g., Linux, Windows, Netware, Unix, etc.). In turn, each can be configured on a common hardware platform 220, with an intervening Xen or other hypervisor layer 260. Representatively, the hardware platform embodies physical I/O and platform devices, memory and a processor, such as a CPU, Disk, USB, etc., while the hypervisor (also known as a "virtual machine monitor," which is the virtual interface to the hardware and virtualizes the hardware), is the lowest and most privileged layer and manages conflicts, for example, caused by operating system access to privileged machine instructions. The hypervisor can also be type 1 (native) or type 2 (hosted), and skilled artisans understand the terminology.

In relation to FIG. 2, the physical distribution, or pDISTRO, is typically functionally configured specifically for the hardware platform and used to deploy physical machine specific hypervisors with drivers, agents, sound cards, etc., needed by specific hardware vendors, and it may also include a file system or a directory service configured specifically for the hardware or a management function and a management interface. The virtual distribution, or vDISTRO, is used to deploy the virtual machines on the physical server and can move application stacks between them in real-time.

Returning to FIG. 3, dom0 is the management domain for Xen guests and dynamically undertakes control of computing resources, such as memory, CPU, etc., provides interface to the physical server, and provides various administration tools. Domains domU, 320 are those that host the application workloads per each virtual machine, including virtual device drivers 350 which connect to the physical drivers 360 in dom0 by the hypervisor or physical device drivers in a direct fashion, and can be stored as a file image on remote or local storage devices (240, FIG. 2). In this regard, an I/O path exists as one or both of a direct I/O path 370 between the physical drivers and the hardware platform 220 or a common I/O path 380 between all of the virtual drivers 350, of domains domU, and the physical drivers 360 of domain dom0. Leveraging this arrangement, one representative location for the common backup agent 250 is at a central location 251 whereby it can monitor or observe all the backup/restore calls in one or both of the direct and virtual I/O paths. To the extent that backup agents are somewhat configured according to a particular operating system, the proposal herein is one whereby the single backup agent 250 is configured to communicate primarily with the Host OS, instead of any guest OS.

In any embodiment, skilled artisans will appreciate that enterprises can implement some or all of the foregoing with humans, such as system administrators, computing devices, executable code, or combinations thereof. In turn, methods and apparatus of the invention further contemplate computer executable instructions, e.g., code or software, as part of computer program products on readable media, e.g., disks for insertion in a drive of computing device, or available as downloads or direct use from an upstream computing device. When described in the context of such computer program products, it is denoted that components thereof, such as modules, routines, programs, objects, data structures, etc., perform particular tasks or implement particular abstract data types within various structures of the computing system which cause a certain function or group of function, and such are well known in the art.

Although the foregoing has been described in terms of specific embodiments, one of ordinary skill in the art will recognize that additional embodiments are possible without departing from the teachings of the present invention. This detailed description, therefore, and particularly the specific details of the exemplary embodiments disclosed, is given primarily for clarity of understanding, and no unnecessary limitations are to be implied, for modifications will become evident to those skilled in the art upon reading this disclosure and may be made without departing from the spirit or scope of the invention. Relatively apparent modifications, of course, include combining the various features of one or more figures with the features of one or more of other figures.

The invention claimed is:

1. In a computing system environment, a method of providing computing backup, comprising:
providing a hardware platform upon which a plurality of virtual machines are configured;
providing a single backup agent for all the plurality of virtual machines; and configuring the single backup agent to monitor a common I/O path between the plurality of virtual machines and the hardware platform.

2. The method of claim 1, further including providing a hypervisor layer on the hardware platform, the common I/O path existing in the hypervisor layer.

3. The method of claim 1, wherein a host operating system exists on the hardware platform which is a same or different operating system than a guest operating system for each said plurality of virtual machines, further including configuring the single backup agent to primarily communicate with the host operating system.

4. In a computing system environment, a method of providing computing backup, comprising:
   providing a hardware platform upon which a plurality of virtual machines are configured;
   providing a hypervisor layer on the hardware platform, including a common I/O path for the virtual machines; and
   providing a single backup agent for all the plurality of virtual machines, the single backup agent configured to monitor data flows in the common I/O path.

5. The method of claim 4, further including providing a direct path I/O between physical drivers in a dom0 domain and the hardware platform.

6. The method of claim 5, further including providing the common I/O path between virtual drivers in a domU domain and the physical drivers in the dom0 domain.

7. In a computing system environment, a method of providing computing backup, comprising:
   receiving a hardware platform upon which a plurality of virtual machines are configured;
   configuring a common I/O path between the virtual machines and the hardware platform; and
   installing a single backup agent for all the plurality of virtual machines, the single backup agent installed to monitor data flows in the common I/O path.

8. The method of claim 7, further including providing a direct path I/O between physical drivers in a dom0 domain and the hardware platform.

9. The method of claim 8, further including providing the common I/O path between virtual drivers in a domU domain and the physical drivers in the dom0 domain.

10. The method of claim 9, further including providing a hypervisor layer on the hardware platform, the common I/O path existing in the hypervisor layer.

11. The method of claim 9, wherein a host operating system exists on the hardware platform which is a same or different operating system than a guest operating system for each said plurality of virtual machines, further including configuring the single backup agent relative to the host operating system.

12. In a computing system environment, a method of providing computing backup, comprising:
   providing a hardware platform having a processor and memory upon which a plurality of virtual machines are configured;
   providing a hypervisor layer on the hardware platform for scheduling control over the plurality of virtual machines, including providing a common I/O path between the plurality of virtual machines and the hardware platform; and
   providing a single backup agent for all the plurality of virtual machines, the single backup agent configured to monitor data flows in the common I/O path.

13. A computing server, comprising:
   a hardware platform, including a processor and memory;
   a hypervisor layer on the hardware platform;
   a plurality of virtual machines each operating as an independent guest computing device on the processor and memory by way of scheduling control from the hypervisor layer; and
   a single backup agent for all of the plurality of virtual machines.

14. The computing server of claim 13, wherein the hypervisor layer further includes an I/O path between I/O devices to be connected to the hardware platform and virtual or physical drivers for the I/O devices, the single backup agent configured to monitor data flows in the I/O path.

15. The computing server of claim 14, wherein the I/O path includes a direct path between physical drivers in a dom0 domain and the hardware platform.

16. The computing server of claim 15, wherein the I/O path includes a virtual path between virtual drivers in a domU domain and the physical drivers in the dom0 domain.

17. The computing server of claim 13, further including a host operating system that is a same or different operating system than a guest operating system for each of the plurality of virtual machines, wherein the single backup agent is prioritized configured to communicate with the host operating system.

18. A computing server, comprising:
   a hardware platform, including a processor and memory;
   a hypervisor layer on the hardware platform including an I/O path;
   a plurality of virtual machines each operating as an independent guest computing device on the processor and memory by way of scheduling control from the hypervisor layer; and
   a single backup agent for the entirety of said plurality of virtual machines, the single backup agent configured to monitor data flows in the I/O path.

19. The computing server of claim 18, including a dom0 operating system that is a same or different operating system than a domU operating system for each said plurality of virtual machines, wherein the single backup agent is configured to communicate relative to the host operating system.

20. The computing server of claim 19, wherein the dom0 operating system is a Linux operating system.

21. The computing server of claim 18, wherein the hypervisor layer is a Xen hypervisor.

22. A computing server, comprising:
   a hardware platform, including a processor and memory;
   a hypervisor layer on the hardware platform;
   a plurality of virtual machines each operating as a guest computing device on the processor and memory by way of scheduling control from the hypervisor layer;
   a common I/O path between the plurality of virtual machines and the hardware platform; and
   a single backup agent configured to monitor the common I/O path for all of the plurality of virtual machines.

23. A computer program product available as a download or on a computer readable medium for loading on a computing server in a computing system environment to provide computing backup, the computer program product having executable instructions, comprising:
   a component of executable instructions to install a single backup agent in a common I/O path between a hardware platform and a plurality of virtual machines that are configured on the hardware platform.

24. The computer program product of claim 23, further including a second component of executable instructions to install a hypervisor layer on the hardware platform, the common I/O path existing in the hypervisor layer.

25. The computer program product of claim 24, further including executable instructions to install the single backup agent to monitor data flows in either or both of 1) a direct path between physical drivers in a dom0 domain and the hardware platform or 2) a virtual path between virtual drivers in a domU domain and the physical drivers in the dom0 domain.

* * * * *